(12) United States Patent  (10) Patent No.: US 8,149,394 B2
Burchardt et al.  (45) Date of Patent: Apr. 3, 2012

(54) CRACK DETECTION SYSTEM

(75) Inventors: Claus Burchardt, Gistrup (DK); Erik Grove-Nielsen, Roslev (DK); Jens Jørgen Østergaard Kristensen, Nibe (DK); Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 421 days.

(21) Appl. No.: 12/386,650

(22) Filed: Apr. 21, 2009

(65) Prior Publication Data

US 2009/0262331 A1 Oct. 22, 2009

(30) Foreign Application Priority Data

Apr. 21, 2008 (EP) ..................... 08007726

(51) Int. Cl.
*G01N 21/00* (2006.01)
(52) U.S. Cl. .................................. 356/237.1
(58) Field of Classification Search .......... None
See application file for complete search history.

(56) References Cited

U.S. PATENT DOCUMENTS 5,374,821 A * 12/1994 Muhs et al. ............ 250/227.16
5,389,789 A * 2/1995 Nguyen .................. 250/341.1

FOREIGN PATENT DOCUMENTS

| DE | 3111858 A1 | 10/1982 |
| DE | 4018379 A1 | 12/1991 |
| EP | 0150268 A2 | 8/1985 |
| FR | 2556833 A1 | 6/1985 |
| GB | 2145515 A | 3/1985 |
| GB | 2145517 A | 3/1985 |
| GB | 2168806 A | 6/1986 |
| WO | WO 2006012827 A1 | 2/2006 |

OTHER PUBLICATIONS

Niels Preben Immerkaer, Ivan Mortensen: "Blade monitoring system", LM Glasfiber A/S, Lunderskov, CVR-No. 25 94 20 94, Nov. 2004; pp. 1-7; www.lmglasfiber.com.

* cited by examiner

*Primary Examiner* — Tu Nguyen (57) ABSTRACT

A crack detection system and a method for detecting cracks in a loaded engineering structure are provided. The system and method include a light source coupled and optical fibers that are led through the structure. The optical fibers have diameters below 75 μm. The light source is coupled to the optical fibers.

21 Claims, 5 Drawing Sheets

CRACK DETECTION SYSTEM

CROSS REFERENCE TO RELATED APPLICATIONS

This application claims priority of European Patent Office application No. 08007726.6 EP filed Apr. 21, 2008, which is incorporated by reference herein in its entirety.

FIELD OF INVENTION

The present invention relates to a crack detection system for detecting cracks in a loaded engineering structure. The loaded engineering structures can be, e.g., a wind turbine rotor blade, an airplane wing, a propeller, a helicopter rotor, a structural car part, a concrete building, a concrete water dam, etc.

BACKGROUND OF INVENTION

Cracks and failures in such loaded engineering structures can have severe consequences. Early warning of a propagating crack can save lives and property.

SUMMARY OF INVENTION

A method and a device by which it is possible to detect cracks in a wind turbine rotor blade is disclosed in WO2006/012827A1. A device for monitoring the state of rotor blades on wind power installations measures the structure-borne noise by at least one displacement sensor arranged on the rotor blade. A frequency spectrum is determined from the sensor signals and compared to reference spectra corresponding to defined states of damage and other particular states. From comparing the determined spectrum with the reference spectra the state of the rotor blade can be determined.

Another way of detecting cracks in wind turbine rotor blades is described in Niels Preben Immerkaer and Ivan Mortesen, LM Glasfiber A/S Lunderskov, November 2004. The authors describe to provide three optical fibres running in parallel to the trailing edge of a wind turbine rotor blade. The distances of the optical fibres from the trailing edge are 2 cm, 4 cm, and 6 cm, respectively. A crack developing from the trailing edge will break the optical fibres beginning with the outermost optical fibre, i.e. the optical fibre that is the closest to the trailing edge. From the number of optical fibres of the crack detection system which are broken the urgency state with respect to the crack can be determined. The optical fibres which are used are part of a fibre Bragg grating system (FBG). Such systems utilise a single fibre of a diameter of about 120 μm.

Outgoing from this state of the art it is a first objective of the present invention to provide an advantageous crack detecting system for detecting cracks in loaded engineering structures which can, in particular, be used for crack detection in wind turbine rotor blades.

It is a second objective of the present invention to provide an advantageous method for detecting cracks in an engineering structure.

The first objective is solved by a crack detection system for detecting cracks in a loaded engineering structure and the second objective is solved by a method for detecting cracks. The depending claims contain further developments of the invention.

An inventive crack detecting system for detecting cracks in a loaded engineering structure comprises a light source, optical fibres that are led through the structure, and a means for coupling the light of the light source into the optical fibres. The optical fibres which are used in the inventive crack detection system have diameters below 75 μm.

The fibres used in fibre Bragg grating systems have, as already mentioned, a diameter of about 120 μm. Moreover, these fibres are extremely fragile. Compared to these fibres, the fibres with a diameter below 75 μm are less fragile and their dimensions are comparable with the dimensions of the fibres in a typical glass fibre laminate. Hence, the fibres with diameters below 75 μm are more robust than those fibres used in fibre Bragg grating system and are in particular useful for use in a fibre reinforced laminated structure such as, e.g., a shell of a wind turbine rotor blade.

In order to increase their capacity of transmitting light the fibres can be led through the structure in form of fibre bundles. Such bundles can consist of up to several hundred single fibres which makes the system even more robust as a higher number of fibres gives redundancy to the system and making it, therefore, less vulnerable.

A further advantage of bundling fibres is that in case of an emerging crack not all fibres of a bundle do necessarily brake at the same time. When more and more fibres of the bundle brake, the transmission of light through the fibre bundle decreases. This is a simple and robust way to measure degradation of the engineering structure, which is, in particular useful if the degradation comes slowly. However, even if a crack develops rapidly a determination of the sequence of breaking of the fibres in a bundle can give hints on the development of the crack which may be useful in evaluating the crack.

As single fibres with diameters below 75 μm, e.g., with diameters of about 50 μm, are used, the bundle is compatible with the surrounding fibres if the engineering structure is made from a fibre reinforced laminated structure. Moreover, bundling the optical fibres increases the capacity of transmitting light which enables cracks to be detected by light emerging from broken fibre bundles with the naked eye, in particular by night. Hence, visually finding cracks during an inspection of the engineering structure by visually detecting light which escapes from fibre bundles that are broken due to a crack in the structure becomes possible.

To ensure proper wetting by glue or matrix material in a laminated structure the fibre bundle can be enclosed in a permeable hose, e.g., a braided hose of plastic fibres (typically thermoplastic polyester) or glass fibres. Alternatively, one or more threads could be wound around the fibre bundles to form an enclosure. The thread or threads wound around the fibre bundles, or the permeable hose could be strongly coloured in order to make the fibre bundles easy to locate. This measure can prevent damage of the optical fibres in case of later repair or maintenance work at the composite laminate structure.

A bundle of fibres that is optionally enclosed in a permeable hose or surrounded by one or more threads can be embedded in the laminate structure when the laminate structure is manufactured, or can be embedded in an existing structure like, for example, a wind turbine rotor blade, by cutting a longitudinal groove into the surface, and afterwards gluing the fibre bundle into this groove. Alternatively, fibre bundles can be glued to the outside or the inside of the structure without cutting a groove. If they are glued to the outside of the structure they will not be covered by paint in order to simplify visual detection of escaping light.

If not only a visible detection should be possible, the optical fibres or the fibre bundles can be connected to light detectors. In addition, a modulation unit connected to the first source for modulating it's light and a time gate unit is connected to the detectors for receiving the detector signals could be present. In this case, the signal from the detector could be passed through the time gate to suppress noise and any other unwanted signal, and hence increase the sensitivity. Moreover, the time gate could be delayed relative to the modulation light from the light source and the time delay could be varied. The time delay resulting in the largest registered signal could be used to estimate the distance of the light source from the cut in the optical fibre or the optical fibre bundle which corresponds to the distance of the crack from the light source.

Alternatively or additionally, light detectors could be located at the ends of the optical fibres or the fibre bundles which are opposite to the ends where the light is coupled into the fibres or the fibre bundles. Then, a transmission coefficient determination unit which determines and monitors the transmission coefficients of the optical fibres or the fibre bundles, in particular their individual transmission coefficients, could be used to detect sudden decreases in the transmission coefficient which would indicate a crack that has opened in the blade.

If a crack is positioned, e.g., in a wind turbine rotor blade in such a way that it opens and closes due to gravitational forces as the rotor rotates, the transmission coefficient as determined would vary cyclically with a frequency corresponding to the rotation frequency of the rotor. Thus, the Fourier coefficient of a time series of transmission coefficients which corresponds to this frequency would give an indication of the severity of the damage. Alternatively, the relative difference between the 10% and the 90% quantities of the time series could be monitored.

To allow performing the mentioned method, a frequency detection unit can be present in the crack detection system which is connected to the transmission coefficient determination unit for receiving transmission coefficient signals representing the transmission coefficients of the optical fibres or the fibre bundles and which is designed to determine frequency components in the transmission signals.

In a further alternative, the light source may be a pulsed light source which emits light pulses with pulse lengths in the range below 500 ns. Moreover, a time delay determination unit would be present which determines the time delay between sending a pulse by the light source and receiving the respective pulse by the detector. Then, the intensity of the light scattered back towards the light source from a cut in the fibres representing a crack of the structure could be monitored. A sudden increase in backscattered intensity can be taken as an indication that a crack has opened. The time delay from the emission of the pulse by the light source to the detection of the reflected light could be used to determine the distance of the cut in the fibres from the light source and, hence, the location of the crack in the blade. The short pulse will make sure that the reflected pulse can be separated from the original pulse.

The light source used in the inventive crack detection system could be any of a light-emitting diode (LED), a laser diode, or any other suitable light source. The light detector could be a light sensitive resistor, a photo diode, or any other suitable light detector. As optical fibres glass fibres or plastic fibres, for example, PMMA-fibres, could be used.

In case cracks, i.e. cuts in optical fibres or fibre bundles, are detected by visual inspection, the light source could be switched off between inspections to ensure a longer lifetime of the light source. If, on the other hand, a continuous monitoring is performed, the light source could be switched off intermittently to prolong the lifetime of the light source.

The inventive crack detection system can be used for performing the inventive method for detecting cracks in an engineering structure. In this method the transmission or reflection of light emitted into the optical fibres or the fibre bundles is monitored and a crack is detected by a sudden change of the transmission or the reflection. In particular, if light detectors are located at the same end of the optical fibres or fibre bundles at which also the light source or light sources is/are located, the reflection would be monitored. On the other hand, if the detectors are located at the far end of the fibres or the fibre bundles with respect to the end at which the light source is located, the transmission would be monitored. A sudden change in transmission or reflection would be a reliable indication of a crack in the engineering structure.

When the light is emitted into the optical fibres or fibre bundles in form of light pulses, a time delay of a reflected light pulse with respect to the emitted light pulse can be determined in order to estimate the distance of the crack from the light source.

The severity of a crack can be estimated if a time series of transmission coefficients or reflection coefficients is established and a Fourier analysis of the time series is performed. This is, in particular, advantageous if the engineering structure is a wind turbine rotor blade. If a crack is positioned such in the rotor blade that it opens and closes due to gravitational forces as the rotor rotates, the transmission coefficient or reflection coefficient would vary cyclically with a frequency corresponding to the rotation frequency of the rotor. Thus, the Fourier coefficient corresponding to this frequency would give an indication of the severity of the damage. The higher the Fourier coefficient is, the higher would be the estimated damage.

Alternatively, instead of performing a Fourier analysis of the time series it would be possible to monitor the difference between the 10% quantile and the 90% quantile of the time series. In other words, the full range of transmission coefficient values or reflection coefficient values would be divided into 10 equal intervals where the quantiles would represent the boundaries between these intervals. If the difference between the number of data points below the 10% quantile on the one hand and below the 90% quantile on the other hand is relatively large, this would mean that the distribution is rather narrow. A narrow distribution, however, means a relatively constant transmission coefficient or reflection coefficient. If a crack is opening and closing due to gravitational forces the distribution of transmission coefficient values or reflection coefficient values would spread so that the difference between the number of data points below the 10% quantile and the number of data points below the 90% quantile would be reduced. A crack would be estimated to be more severe if the reduction is high.

BRIEF DESCRIPTION OF THE DRAWINGS

Further features, properties and advantages of the present invention will become clear from the following description of embodiments of the invention in conjunction with the accompanying drawings.

DETAILED DESCRIPTION OF INVENTION

Figure 1:
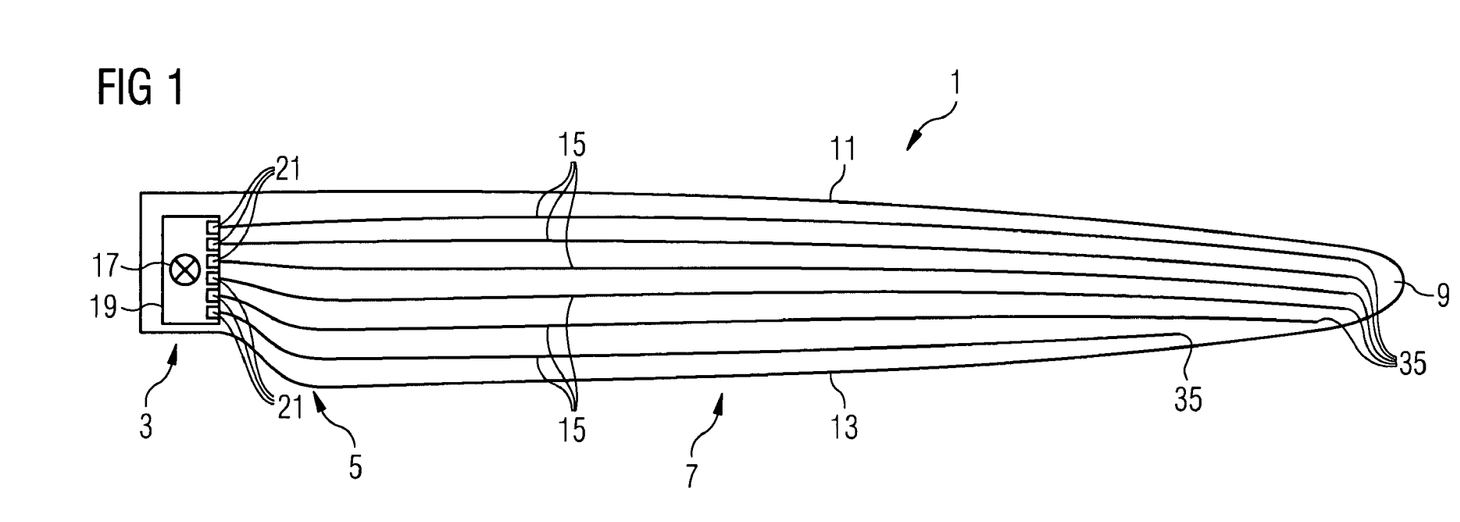
FIG. 1 shows an inventive crack detection system in the context of a wind turbine rotor blade.

FIG. 1 shows a first embodiment of an inventive crack detection system in a wind turbine rotor blade. Note that the wind turbine rotor blade is only an example for an engineering structure in which the crack detection system can be used.

The wind turbine rotor blade 1 shown in FIG. 1 comprises a root section 3, a shoulder 5 which adjoins the root section in outward direction of the blade, and an airfoil section 7 which extends from the shoulder 5 to the blade's tip 9. Furthermore, the blade 1 comprises a leading edge 11 and a trailing edge 13.

The blade shown in FIG. 1 is equipped with an inventive crack detection system. The crack detection system comprises a plurality of optical fibre bundles 15 in which the single fibres have diameters below 75 μm, a light source 17 which is, in the present embodiment, located in the root section of the blade 1, and a means 19 for coupling the light of the light source into the fibre bundles 15. The means for coupling the light into the fibre bundles 15 is indicated in the figure as block 19. Suitable means for coupling light into optical fibres or fibre bundles are known to those skilled in the art and will therefore not be described here. The light source can be at least one incandescent lamp, one or more super luminescent light emitting diodes, or at least one laser or laser diode.

Although fibre bundles 15 which may contain up to several hundred single optical fibres are used in the present embodiment, the use of fibre bundles is not mandatory. Instead, single optical fibres of diameters below 75 μm could, in principle, be used as well. Whether fibre bundles or single optical fibres which extend through the blade are used depends on the amount of light which shall be transferred through the fibre bundles or optical fibres respectively.

The inventive crack detection system of the first embodiment further comprises a number of light detectors 21 for detecting light reflected back towards the light source, one light detector 21 for each of the optical fibre bundles 15, in the present embodiment. However, it is also conceivable to use a light detector 21 for a subset of the optical fibre bundles 15, i.e. to connect more than one fibre bundle to a light detector.

Although the light source 17, the means 19 for coupling the light into the fibre bundles and the light detectors 21 are shown to be located in the root section in FIG. 1 they could as well be located in a different location, for example, in the rotor hub to which the rotor blade is connected. This would offer the advantage that a single arrangement of a light source, means for coupling light into fibre bundles and light detectors would be sufficient for all rotor blades of the rotor.

Figure 2:
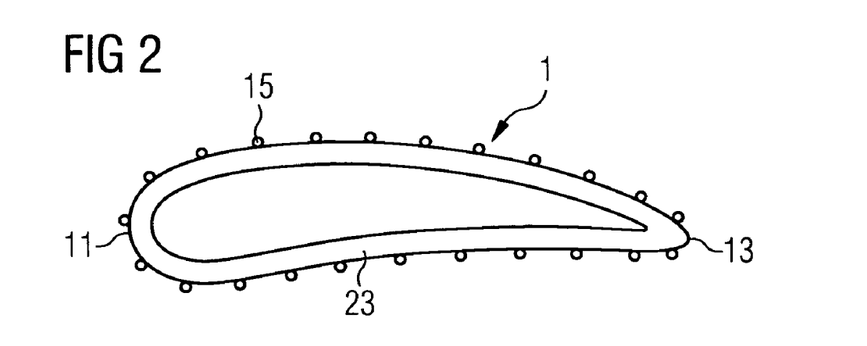
FIG. 2 shows a first alternative of arranging the optical fibres or optical fibre bundles of the crack detection system.
Figure 3:
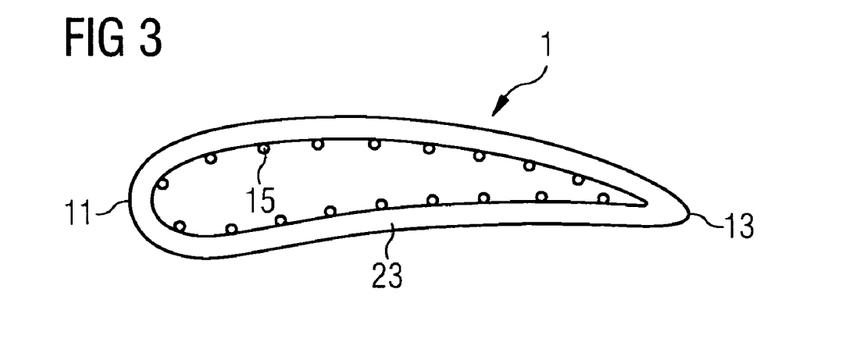
FIG. 3 shows a second alternative of arranging the optical fibres or fibre bundles of a crack detection system.
Figure 4:
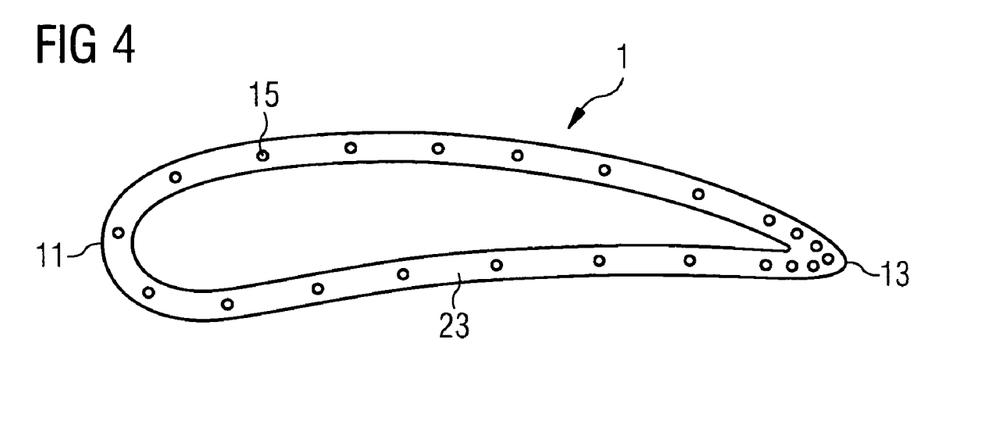
FIG. 4 shows a third alternative of arranging the optical fibres or fibre bundles of a crack detection system.

FIGS. 2 to 4 show three different options to arrange the optical fibre bundles 15, or single optical fibres, in the blade 1. The figures show cross sections through the blade 1 from the leading edge 11 to the trailing edge 13.

In FIG. 2 the optical fibre bundles 15 are located at the outside of the blade's shell 23. They could be fixed to the shell 23 by gluing them to the shell's outer surface. In order to minimise the impact of the optical fibre bundles 15 on the aerodynamics of the blade 1 the diameters of the fibre bundles should be as low as possible, i.e. the fibre bundles should consist only of a few single fibres. Gluing at the outside of the blade's shell 23 is, in particular, suitable if single optical fibres are used instead of fibre bundles 15 since their diameters below 75 μm prevents the single optical fibres from having a large impact on the aerodynamics of the blade 1.

A further option of arranging the fibre bundles 15, or single optical fibres, is shown in FIG. 3. Like in FIG. 2, the fibre bundles 15 are glued to the shell 23 of the wind turbine rotor blade. However, in difference to the option depicted in FIG. 2 the fibre bundles of FIG. 3 are glued to the inner surface of the shell 23 so that they do not have any impact on the aerodynamics of the blade 1. For the rest, that what has been said with respect to the fibre bundles 15 or optical fibres, respectively, shown in FIG. 2 is also valid for the fibre bundles or fibres shown in FIG. 3.

A third option of arranging the fibre bundles 15, or single optical fibres, is depicted in FIG. 4. In this arrangement, the optical fibre bundles 15 are integrated into the shell 23 of the rotor blade 1, which is usually a fibre reinforced laminated structure. This means that the optical fibres or optical fibre bundles 15 can be easily integrated into the shell when the shell's laminated structure is formed. The diameter of the single optical fibres, which is below 75 μm and, in particular, in the range of about 50 μm, makes them compatible with the surrounding fibres of a typical fibreglass laminate used for making wind turbine rotor blade shells.

Figure 5:
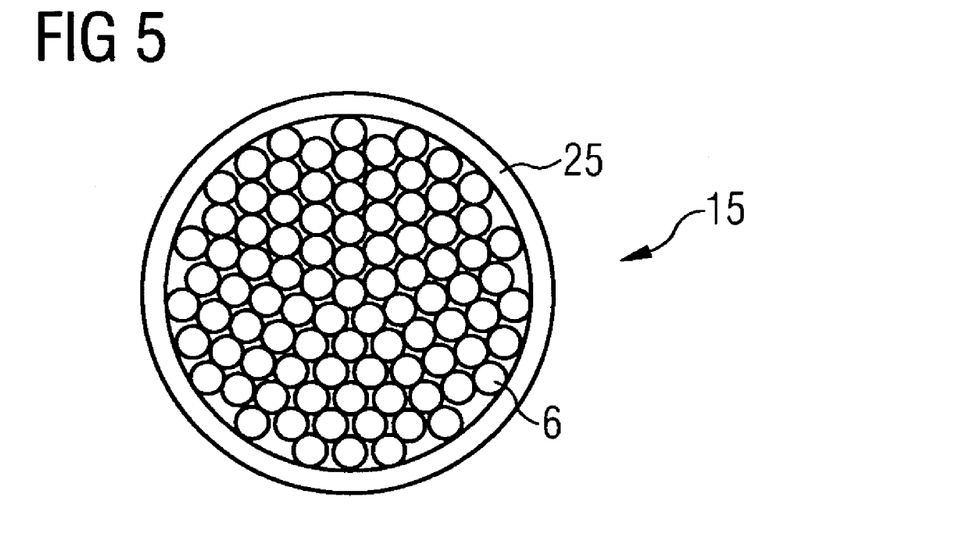
FIG. 5 shows an optical fibre bundle enclosed by a hose.
Figure 6:
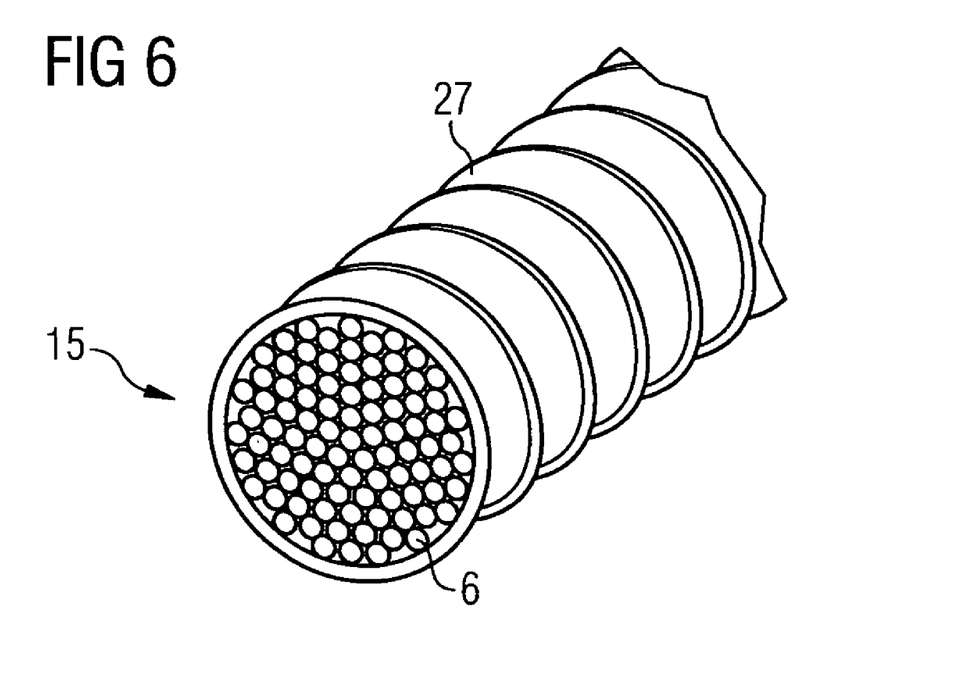
FIG. 6 shows an optical fibre bundle enclosed by a threat wound around the fibre bundle.

In order to ensure proper wetting of the fibre bundles or fibres by glue or a liquid polymer used in forming the shell 23, the fibres or fibre bundles can be enclosed in a permeable hose 25 such as a braided hose of plastic fibres, typically thermoplastic polyester, or glass fibres. An optical fibre bundle 15 consisting of a plurality of optical fibres 6 surrounded by a hose 25 is shown in FIG. 5 in a sectional view. Alternatively the fibres 6 of the fibre bundle 15 can be enclosed by one or more threads wound around an optical fibre or an optical fibre bundle, as it is shown in FIG. 6. Such a hose or thread can be strongly coloured in order to enable easy location of the fibre or the fibre bundle to prevent damage of the fibre or fibre bundle if the shell 23 needs to be revised or repaired.

Figure 7:
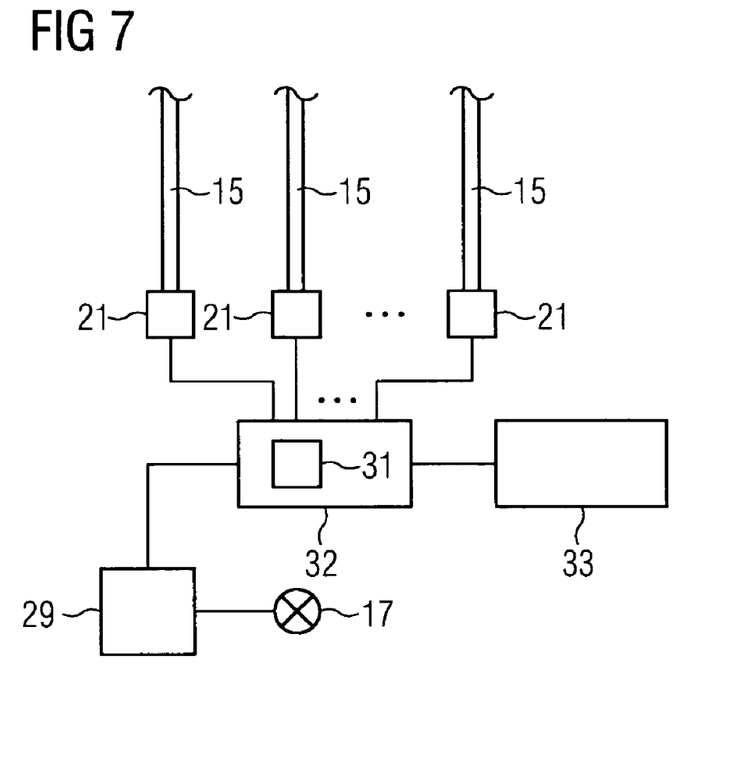
FIG. 7 shows a detail of the crack detection system shown in FIG. 1.

The way of detecting the crack by use of the crack detection system shown in FIG. 1 will now be described with respect to FIG. 7. FIG. 7 shows in more detail the light source 17, the optical fibre bundles 15, and the light detectors 21. The means for coupling the light into the optical fibres 15 is omitted in the figure to keep the figure more simple. The crack detection system comprises a modulation unit in form of a pulse generator 29 for generating light pulses which are to be coupled into the optical fibres 15. The pulse generator 29 can act on the light after this has been emitted by the light source 17. Such a pulse generator could be realised, for example, in form of a chopping mechanism like a shutter, a chopping wheel, et cetera. Alternatively the pulse generator 29 can act on the light source 17 itself so as to operate the light source 17 in a pulsed mode, i.e. such that the light source 17 itself emits the light in form of light pulses. In the embodiment shown in FIG. 7, the pulse generator 29 is connected to the light source 17 in order to provide control signals for operating the light source 17 in a pulsed mode with pulse lengths in the range below 500 ns.

The pulse generator 29 is connected to a window generator 31 in a time gate unit 32 which is connected to the light detectors 21 for receiving signals representing detected light. The time gate 32 passes signals to the analyser 33 if they arrive within the time window defined by the window generator 31. Otherwise the signals from the light detectors 21 would not be passed to the analyser 33. The window generator 31 is adjustable such that the length of the time window can be adjusted and that the time difference between sending a light pulse and the centre of the time window can be shifted. Hence, the time gate unit 32 is operated as time delay determining unit.

In use of the crack detection system the time window 31 is initially large enough to allow every signal from a light detector to pass towards the analyser. If the blade does not show any cracks the light pulses from the light source 17 will pass the fibre bundles 15 and leave them at the tip ends 35 of the fibre bundles so that the light detectors 21 do not detect any light. However, in case of a crack a cut in the fibre bundle or a part of a fibre bundle could occur which would lead to reflections so that light is reflected back from the crack to at least one light detector 21. In order to achieve this, the fibre bundles are sufficiently close to each other that a crack which exceeds a given critical dimension would in any case cut a fibre bundle.

Once reflected light is detected by the analyzer 33 the time window is decreased such that its length is sufficiently less than the time between two light pulses. Then the offset of the window's centre with respect to the time of emitting the light pulse is shifted and the intensity received by the light detector 21 is monitored. From the time difference between sending the light pulse and the centre of the time window when the detected light shows a maximum the distance of the cut in the fibre bundle 15 from the detector 21 can be estimated. Hence, the inventive crack detection system not only indicates the presence of a crack but also gives a hint on the location of the crack in the blade. However, if only the presence of a crack is needed to be detected, the time gate 32 and the pulse generator 29 can be omitted since in this case no pulsed emission of light is necessary.

Optical fibre bundles 15 with up to several hundred single optical fibres 6, e.g. 400 fibres, can be used so as to transmit a large amount of light. In case of a crack a fraction of this light would be reflected to a light detector. The remaining light would leave the fibre bundle and the rotor blade 1 through the cut and the crack, respectively. In such a case one could locate the crack by optical inspection with the naked eye, in particular by night. The light detector would then only be used for triggering an alarm which initiates such an inspection. Moreover, if inspections are performed on a routinely basis the light detectors 21 could be omitted at all since with the use of large optical fibre bundles the crack detection could be fully based on visual inspection with the naked eye by night.

If, on the other hand, the crack detection system as it is shown in FIG. 7 is used, there may be no need to use optical fibre bundles of several hundred fibres, or even no need to use fibre bundles at all, if the sensitivity of light detectors is large enough to detect light which is reflected in few optical fibres or a single optical fibre with a diameter below 75 μm. Then, whether the crack detection system is kept simple with relatively large optical fibre bundles or more complex with small optical fibre bundles or single optical fibres could be made dependent on whether an automated crack detection or a crack detection by regular visual inspections is desired.

However, not only the large amount of light transmitted through a fibre bundle with up to several hundred fibre bundles is an advantage of the bundles but also that incremental breakage of the fibres, one by one, tells a story—in quantity—about the rising damage in the area where the bundle is located. When more and more fibres break, an increase of the intensity of reflected light would be detected at the location of the light source—or a decrease in transmission if the light detectors are located at the far ends of the fibre bundles with respect to the light source. This is a simple and robust way to measure degradation. When the individual broken fibre crack opens and closes during a rotor revolution, the signal is modulated (sinusoidal). A single fibre, however, would only allow to detect a binary signal, like reflection off-reflection on (or transmission on-transmission off).

Figure 8:
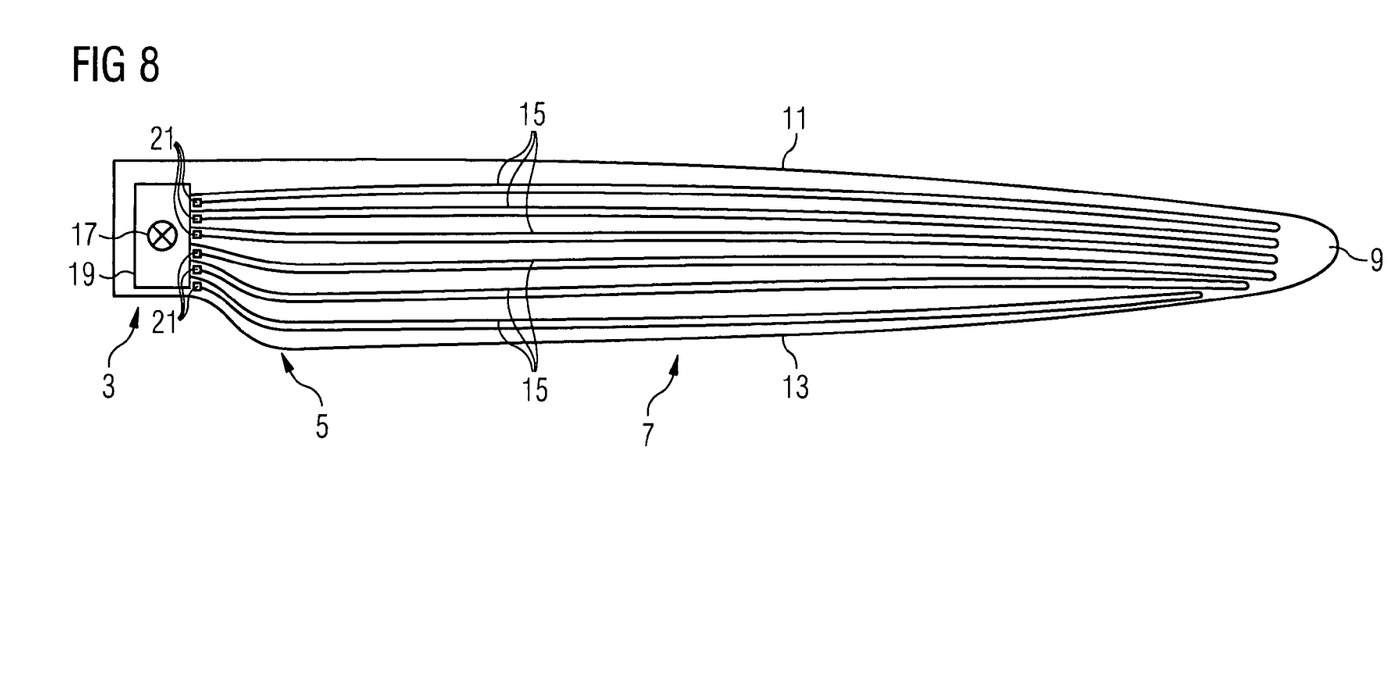
FIG. 8 shows a second embodiment of the inventive crack detection system in the context of a wind turbine rotor blade.
Figure 9:
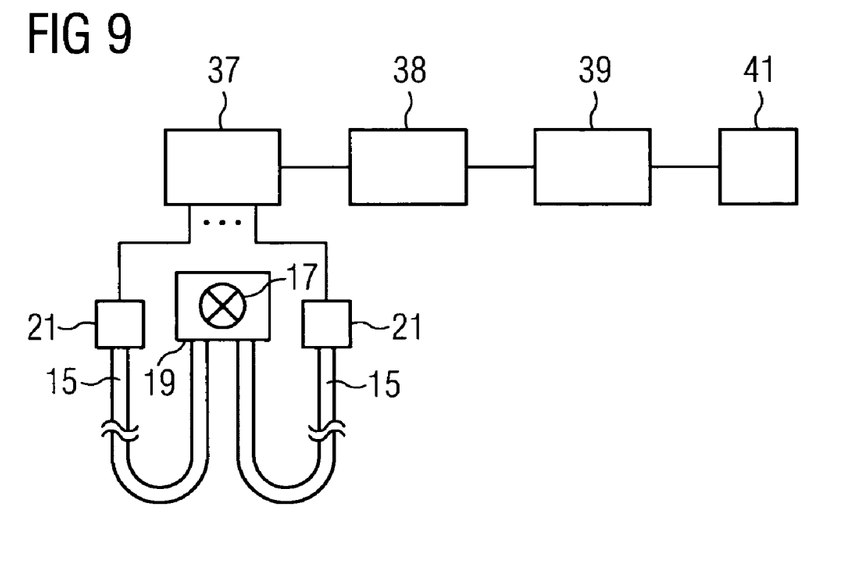
FIG. 9 shows a detail of the second embodiment of the crack detection system.

A second embodiment of the inventive crack detection system is shown in FIGS. 8 and 9. The second embodiment differs from the first embodiment in the location of the light detectors 21. Unlike in the first embodiment the light detectors 21 are located at the far ends of the optical fibre bundles 15 rather than at the light source ends. This means that in case of a crack which cuts a fibre bundle 15 the light detectors 21 would not detect an increase of light but a decrease since the transmission is decreased by the crack. Such a crack detection system can be equipped with a transmission coefficient determination unit 37 (see FIG. 9) which determines the transmission coefficient through an optical fibre bundle 15 on the basis of the intensity detected by the respective light detector 21 and the known intensity of the light source 17. A time series generator 38 is connected to the transmission coefficient determination unit 37 for receiving the transmission coefficients and forming the time series of transmission coefficients. Moreover, a frequency detection unit 39 is connected to the time series generator 38 for receiving the generated time series. The frequency detection unit 39 performs a Fourier analysis of the time series and finds the Fourier coefficient of the time series which corresponds to the rotation frequency of the rotor. This transmission coefficient is then output to an analysing unit 41 which is connected to the frequency detection unit 39 and which performs an estimate of the severity of the crack based on the Fourier coefficient. This is possible if the crack opens and closes due to gravitational forces acting on the blade during a rotation cycle since the transmission coefficient of the respective fibre bundle would vary between a maximum value (when the crack is closed) to a minimum value (when the crack is open) with a periodicity which corresponds to the rotational frequency of the rotor.

A large Fourier coefficient would indicate a large impact of the crack on the transmission coefficient which would allow the crack to be estimated as being severe.

A possible alternative to Fourier analysing of the time series would be to monitor the difference between the 10% quantile and the 90% quantile of the transmission coefficient values of the time series. The 10% quantile would represent all values the probability of which to occur would be less than 10%. On the other hand, the 90% quantile would be all values the probability of which to occur would be 90%. If the ratio of the 10% quantile to the 90% quantile would change this would indicate a crack. The degree of change would give an indication of the crack's severity. The reason is that due to the already mentioned gravitational forces the number of high transmission coefficients and the number of low transmission coefficients would increase so that the ratio of the 10% quantile to the 90% quantile would increase as well. A slight increase of the ratio would then mean that only few transmission coefficient values would be detected which lie below the average. In case of a large crack much more transmission coefficient values would be detected which lie well below the average value during a rotational cycle. In this way a large crack would lead to a bigger ratio of the 10% quantile to the 90% quantile as compared to a small crack.

The optical fibres or optical fibre bundles in the inventive crack detection system can be evenly distributed over the blade's cross section they could be unevenly distributed. In particular, the number of optical fibres or optical fibre bundles could be increased in areas of the blade which are more prone to cracks than others. An example is shown in FIG. 4 where the density of fibre bundles in the trailing edge 13 of the blade is increased with respect to the rest of the blade.

The described crack detection system not only allows for detecting cracks in engineering structures like, in particular, wind turbine rotor blades, but allows also for a location and an estimate of the severity of the damage. In case the system should be kept as simple as possible, it can also be designed such that a crack detection with the naked eye is possible, in particular by night.

The invention claimed is:

1. A crack detection system for detecting cracks in a loaded engineering structure, comprising:
   a light source which emits a light; and
   optical fibres or fibre bundles having the optical fibres,
   wherein the optical fibres having diameters below 75 μm,
   wherein the optical fibres or the fibre bundles are attached to the engineering structure or within the engineering structure and are coupled to the light source,
   wherein a crack in the engineering structure is detected by a sudden change of the transmission of the light or the reflection of the light, and
   wherein the engineering structure is a wind turbine rotor blade.

2. The crack detection system as claimed in 1, wherein the fibre bundles are enclosed in a permeable hose or by a thread wound around the fibre bundles.

3. The crack detection system as claimed in 1, wherein the optical fibres or the fibre bundles are glued to an outside.

4. The crack detection system as claimed in 1, wherein the optical fibres or the fibre bundles are glued to an inside of the engineering structure.

5. The crack detection system as claimed in 1, wherein the engineering structure comprises a shell made from a fibre laminate and in which the optical fibres or fibre bundles are embedded in the laminate.

6. The crack detection system as claimed in 1, wherein the optical fibres or the fibre bundles are connected to light detectors.

7. The crack detection system as claimed in claim 6, further comprising:
   a modulation unit connected to the light source for modulating the light of the light source; and
   a time gate unit connected to the detectors for receiving signals from the light detectors.

8. The crack detection system as claimed in claim 6, further comprising:
   a transmission coefficient determination unit determines and monitors transmission coefficients of the optical fibres or the fibre bundles, and
   wherein that the light detectors are located at a first end of the optical fibres or the fibre bundles, the first end opposite to a second end where the light is coupled to the optical fibres or the fibre bundles.

9. The crack detection system as claimed in claim 8, further comprising:
   a frequency detection unit connected to the transmission coefficient determination unit for receiving transmission signals representing the transmission coefficients of the optical fibres or the fibre bundles and which determines frequency components in the transmission signals.

10. The crack detection system as claimed in claim 6, further comprising:
    a light detector; and
    a time delay determining unit that determines a time delay between emitting the light, which is a pulsed light, and receiving the respective pulsed light by the light detector,
    wherein the light source is a pulsed light source which emits the pulsed light with a pulse length below 500 ns, and
    wherein that the light detectors are located at the same end of the optical fibres or fibre bundles as the light source.

11. The crack detection system as claimed in claim 1, further comprising:
    a modulation unit connected to the light source for modulating the light of the light source;
    a time gate unit connected to the detectors for receiving signals from the light detectors; and
    a transmission coefficient determination unit determines and monitors transmission coefficients of the optical fibres or the fibre bundles, and
    wherein that the light detectors are located at a first end of the optical fibres or the fibre bundles, the first end opposite to a second end that is where the light is coupled to the optical fibres or the fibre bundles.

12. The crack detection system as claimed in claim 11, further comprising:
    a frequency detection unit connected to the transmission coefficient determination unit for receiving transmission signals representing the transmission coefficients of the optical fibres or the fibre bundles and which determines frequency components in the transmission signals.

13. The crack detection system as claimed in claim 11, wherein that the light detectors are configured to receive a reflection of the light due to crack.

14. The crack detection system as claimed in claim 1, further comprising:
    a light detector; and
    a time delay determining unit that determines a time delay between emitting the light, which is a pulsed light, and receiving the respective pulsed light by the light detector,
    wherein the light source is a pulsed light source which emits the pulsed light with a pulse length below 500 ns, and
    wherein that the light detectors are located at the same end of the optical fibres or fibre bundles as the light source.

15. The crack detection system as claimed in claim 1, wherein optical fibres or fibre bundles have a minimal impact on the aerodynamics of the wind turbine rotor blade.

16. The crack detection system as claimed in claim 1, wherein optical fibres or fibre bundles have no impact on the aerodynamics of the wind turbine rotor blade.

17. A method for detecting cracks in a wind turbine rotor blade by use of a crack detection system, comprising:
    providing a light source that emits a light into optical fibres or fibre bundles including the optical fibres, wherein the optical fibres or fibre bundles are attached to the engineering structure or within the engineering structure and are coupled to the light source;
    monitoring a transmission or a reflection of the light emitted into optical fibres or fibre bundles; and
    detecting a crack by a sudden change of the transmission or the reflection,
    wherein the optical fibres having diameters below 75 μm in order to at least minimize an impact on the aerodynamics of the wind turbine rotor blade.

18. The method as claimed in claim 17,
    wherein the emitted light is a light pulse that is emitted into the optical fibres or fibre bundles and reflected, the method further comprising:
    determining a time delay of the reflected light pulse with respect to the emitted light pulse.

19. The method as claimed in claim 17, further comprising:
establishing a time series of transmission coefficients or reflection coefficients; and
performing a Fourier analysis of the time series is performed.

20. The method as claimed in claim 17, further comprising:
establishing a time series of transmission coefficients or reflection coefficients; and
monitoring the difference between the 10% quantile and the 90% quantile of the time series.

21. The method as claimed in claim 17, further comprising determining the location of the crack from a time delay from the emission of the light source to the detection.

* * * * *